(12) United States Patent
Miyairi et al.

(10) Patent No.: US 8,449,806 B2
(45) Date of Patent: May 28, 2013

(54) LASER PROCESSING APPARATUS

(75) Inventors: Hidekazu Miyairi, Tochigi (JP); Yasuyuki Arai, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 953 days.

(21) Appl. No.: 11/984,905

(22) Filed: Nov. 26, 2007

(65) Prior Publication Data

US 2008/0087640 A1    Apr. 17, 2008

Related U.S. Application Data

(62) Division of application No. 10/654,611, filed on Sep. 4, 2003, now Pat. No. 7,312,135.

(30) Foreign Application Priority Data

Sep. 5, 2002   (JP) .................................. 2002-260675

(51) Int. Cl.
   *B29C 35/08*   (2006.01)
(52) U.S. Cl.
   USPC .......................................... 264/400; 264/101
(58) Field of Classification Search
   USPC ................................. 264/400, 101
   See application file for complete search history.

(56) References Cited

U.S. PATENT DOCUMENTS

| 4,889,069 | A | 12/1989 | Kawakami |
| 4,981,525 | A | 1/1991 | Kiyama et al. |
| 5,234,499 | A | 8/1993 | Sasaki et al. |
| 5,770,785 | A | 6/1998 | Tamura et al. |
| 5,950,071 | A | 9/1999 | Hammond et al. |
| 5,977,515 | A * | 11/1999 | Uraki et al. .............. 219/121.84 |
| 5,981,902 | A | 11/1999 | Arita et al. |
| 6,057,233 | A | 5/2000 | Nakamura et al. |
| 6,066,032 | A | 5/2000 | Borden et al. |
| 6,156,676 | A | 12/2000 | Sato et al. |
| 6,322,958 | B1 | 11/2001 | Hayashi |
| 6,701,942 | B2 | 3/2004 | Lee et al. |
| 6,720,522 | B2 | 4/2004 | Ikegami et al. |

(Continued)

FOREIGN PATENT DOCUMENTS

| EP | 1080821 A | 3/2001 |
| EP | 1 338 371 | 8/2003 |

(Continued)

*Primary Examiner* — Galen Hauth
(74) *Attorney, Agent, or Firm* — Eric J. Robinson; Robinson Intellectual Property Law Office, P.C.

(57) ABSTRACT

The present invention provides a laser processing apparatus having a laser oscillator for outputting a pulsed laser beam; deflection unit for deflecting the pulsed laser beam to irradiate a object to be processed with the deflected pulsed laser beam; a mounting base on which the object is placed and which is movable in an axial direction or two-axial directions perpendicular to each other; and local shielding unit for controlling an atmosphere around the surface of the object to be processed which is irradiated with the laser beam. When a thin semiconductor film with a thickness of 1 μm or less is formed over the surface, minute convex portions are formed, which causes a problem that characteristics of TFTs vary among elements. Minute particles generated and adhered to a main surface of a substrate through a laser processing, which is difficult to remove in general surface cleaning, become preventable by the invention.

16 Claims, 3 Drawing Sheets

U.S. PATENT DOCUMENTS

| | | |
|---|---|---|
| 6,730,447 B2 | 5/2004 | Ito et al. |
| 6,777,642 B2 | 8/2004 | Song et al. |
| 6,805,751 B2 | 10/2004 | Allen |
| 6,827,816 B1 | 12/2004 | Uziel et al. |
| 6,835,319 B2 | 12/2004 | Song et al. |
| 6,846,696 B2 | 1/2005 | Adachi et al. |
| 6,881,687 B1 | 4/2005 | Castrucci |
| 6,992,026 B2 | 1/2006 | Fukuyo et al. |
| 7,052,367 B2 | 5/2006 | Kimura et al. |
| 7,141,123 B2 | 11/2006 | Lee et al. |
| 7,396,742 B2 | 7/2008 | Fukuyo et al. |
| 2002/0180110 A1* | 12/2002 | Yamaguchi et al. .......... 264/400 |
| 2005/0173387 A1 | 8/2005 | Fukuyo et al. |
| 2005/0181581 A1 | 8/2005 | Fukuyo et al. |
| 2005/0184037 A1 | 8/2005 | Fukuyo et al. |
| 2005/0189330 A1 | 9/2005 | Fukuyo et al. |
| 2005/0194364 A1 | 9/2005 | Fukuyo et al. |
| 2006/0040473 A1 | 2/2006 | Fukuyo et al. |

FOREIGN PATENT DOCUMENTS

| | | |
|---|---|---|
| JP | 57-007392 A | 1/1982 |
| JP | 62-020787 | 2/1987 |
| JP | 63-127794 | 8/1988 |
| JP | 01-135565 | 5/1989 |
| JP | 02-099293 | 4/1990 |
| JP | 04-061955 | 2/1992 |
| JP | 04-111415 | 4/1992 |
| JP | 04-172191 A | 6/1992 |
| JP | 07-185875 A | 7/1995 |
| JP | 08-224677 A | 9/1996 |
| JP | 09-141480 A | 6/1997 |
| JP | 09-141484 | 6/1997 |
| JP | 09-174262 | 7/1997 |
| JP | 11-005181 | 1/1999 |
| JP | 11-058043 | 3/1999 |
| JP | 2000-158156 A | 6/2000 |
| JP | 2000-178174 | 6/2000 |
| JP | 2001-219289 | 8/2001 |
| JP | 2002-178174 | 6/2002 |
| JP | 2002-192367 | 7/2002 |
| JP | 2003-031466 | 1/2003 |

* cited by examiner

LASER PROCESSING APPARATUS

BACKGROUND OF THE INVENTION

1. Field of the Invention

The present invention relates to a laser processing apparatus, and more particularly to a laser marking apparatus used for marking on a substrate and the like.

2. Description of the Related Art

In a manufacturing process of a semiconductor device, marking of characters and numeric characters is directly performed on a substrate using a laser in order to manage the substrates which flow through a manufacturing line.

As to an example of a laser processing apparatus used for this kind of application, a $CO_2$ gas laser oscillator is used, and a laser beams is oscillated by a polygon mirror and directed to a predetermined place of a glass substrate, whereby marking of characters, symbols, and the like is performed. Then, in some cases, a gas nozzle for spraying $N_2$ gas is provided for a place to be marked with the purpose of avoiding cracks and with the purpose of cooling the place (for example, refer to JP 11-005181A(pp. 3-4, FIG. 1)).

A problem of a conventional laser processing apparatus used for marking resides in that minute particles or dusts, which are generated secondarily, contaminate a surface of a glass substrate in a process of forming a large number of concave parts in the surface of the substrate by laser ablation.

The inventor has found that: when minute particles, each of which is generated through a process of laser marking and has a diameter of approximately from 0.1 μm to 1 μm, adhere to a main surface of a glass substrate, it is difficult to remove the particles in general surface cleaning; when a thin semiconductor film with a thickness of 1 μm or less is formed on the surface, minute convex portions are formed; and as a result, characteristics of thin film transistors (TFTs) vary among elements. Further, the inventor has found that, when thermal processing such as laser annealing is performed to the semiconductor film, a part of the semiconductor film, to which the processing has been performed, bursts out and flies, as a result, a minute hole with a diameter of approximately from 0.2 μm to 2 μm is formed. This causes dispersion in the characteristics of TFTs among elements. Further, abnormal shapes such as the above-described convex portions and holes cause heat generation due to a concentration of the electric field at the portions, which leads to characteristic abnormality and decrease in reliability in the TFT.

Of course, it is considered that marking is performed to a rear surface (opposite surface to the main surface over which a film such as a semiconductor film is formed) of a glass substrate. However, a marking portion comes to have unevenness through ablation, and therefore, a problem arises, when the glass substrate is placed on a flat surface, the flat surface is not in parallel with the main surface of the substrate, which poses an obstacle in a manufacturing process of a semiconductor device. For example, when a substrate is to be fixed over a mounting base of an exposure apparatus, a glass substrate is warped, which leads to a defect that accurate patterns are not exposed.

SUMMARY OF THE INVENTION

The present invention has been made in view of the above problem, and therefore has an object to provide a laser processing apparatus that enables possibly inexpensive and satisfactory marking.

A laser processing apparatus according to the present invention comprises: a laser oscillator for outputting a pulsed laser beam; deflection unit for deflecting the pulsed laser beam to irradiate a object to be processed; a mounting base on which the object to be processed is placed and which is movable in an axial direction or two-axial directions perpendicular to each other; in irradiation of the object to be processed with the pulsed laser beam; and local shielding unit for controlling an atmosphere around the surface of the object to be processed which is irradiated with the laser beam when the pulsed laser beam is irradiated thereto.

The local shielding unit is provided with an entrance window for receiving and transmitting pulsed laser beam at an upper surface of the unit. Further, the local shielding unit is provided with an exhaust port at a side surface of an upper portion inside the local shielding unit. The exhaust port forcibly exhausts atmospheric gas around the surface of the object to be processed, which is irradiated with the laser beam.

Further, as to another structure of the local shielding unit, the unit is provided with a window for receiving and transmitting pulsed laser beams at an upper surface of the unit; the unit is provided with an opening portion for jetting nitrogen gas or inert gas from an outer circumferential portion thereof; and is provided with an exhaust port for forcibly exhausting gas, which is at a side surface of the upper portion inside the unit. The shielding unit filled with the gas is above the surface of the object to be processed, which is irradiated with the laser beam, and the gas is forcibly exhausted through the exhaust port.

In the above-described structure according to the present invention, the exhaust port is provided inside the local shielding unit, and the gas in the local shielding unit is forcibly exhausted. As a result, a flow current is generated from an outer circumferential portion to the inner side surface of the upper portion at which the exhaust port is provided. Therefore, the minute particles, each of which is generated through laser marking and has a diameter of approximately from 0.1 μm to 1 μm, can be prevented from scattering to the periphery to the object to be processed and adhering to the main surface thereof.

Note that, as to a convenient unit, a local shield may be formed of a transparent material with respect to a wavelength of the pulsed laser beam to thereby cover a processing region.

A laser processing apparatus according to the present invention comprises: a laser oscillator for outputting a pulsed laser beam; deflection unit for deflecting the pulsed laser beam to irradiate a substrate; a mounting base on which the substrate is placed and which is movable in an axial direction or two-axial directions perpendicular to each other; and application unit for forming a protective film over a surface of the substrate when the pulsed laser beam is irradiated thereto.

It is sufficient that the protective film is temporarily formed at the time of laser processing, and the film is not necessarily adhered to the substrate surface. As the protective film in the form of liquid, there may be adopted one obtained by thinly applying liquid such as water or alcohol onto the substrate surface. In this case, the protective film may be formed by performing spin coating with an applicable solution or spraying the solution in the form of mist. The protective film provides an effect of preventing minute particles from scattering at the time of laser processing. Therefore, even if the minute particles each of which has a diameter of approximately from 0.1 μm to 1 μm scatter, they can be prevented from adhering to the main surface of the substrate. Thereafter, the protective film in the form of liquid can be easily removed by being dried after laser processing.

The laser processing apparatus according to the present invention can be used particularly as a laser marking apparatus for marking the substrate with a laser beam.

In the laser processing apparatus according to the present invention, the local shielding unit is provided for the irradiation area of the laser beam, and the gas in the local shielding unit is forcibly exhausted. Thus, the flow current is generated from the outer circumferential portion to the side surface of the upper portion inside the local shielding unit where the exhaust port is provided. As a result, the minute particles each of which is generated through the laser marking and which has a diameter of approximately from 0.1 μm to 1 μm can be prevented from scattering to the periphery of the object to be processed and adhering to the main surface of the object.

Further, as other embodiment mode of the laser processing apparatus, an application unit is provided therein, and a protective film in the form of liquid is formed by thinly applying liquid such as water or alcohol onto the substrate surface. Therefore, the minute particles can be prevented from scattering in laser processing. Even if the minute particles each of which has a diameter of approximately from 0.1 μm to 1 μm scatter, they can be prevented from adhering to the main surface of the substrate.

The present invention provides the effect of preventing the particles, which scatter in processing, from adhering to the surface of the glass substrate to which laser processing is performed and keeping the surface of the glass substrate clean. Of course, the present invention is not limited to the glass substrate, and can be applied to a quartz substrate, a semiconductor substrate, a plastic substrate, and the like.

In addition, when an object to be processed such as a substrate is processed by using the laser beam, the object can be prevented from being contaminated due to droplets of processed powder or being scratched. Therefore, the laser processing apparatus can be employed for various materials such as glass, metal, and ceramic.

Laser processing is a widely used technique in various fields of industrial application such as cutting, drilling and welding. And the present invention can be applied not only to marking on a semiconductor film but also to the removal of minute articles created during laser processing.

DETAILED DESCRIPTION OF THE INVENTION

Description will be made of forms of a laser processing apparatus according to the present invention with reference to the accompanying drawings. Note that the present invention can be implemented in various forms, and it is understood easily by those skilled in the art that embodiment modes and details of the invention can be variously changed without departing from the spirit and scope of the invention. Therefore, the present invention is not construed with a limitation put on the contents of the embodiment modes.

Embodiment Mode 1

Figure 1:
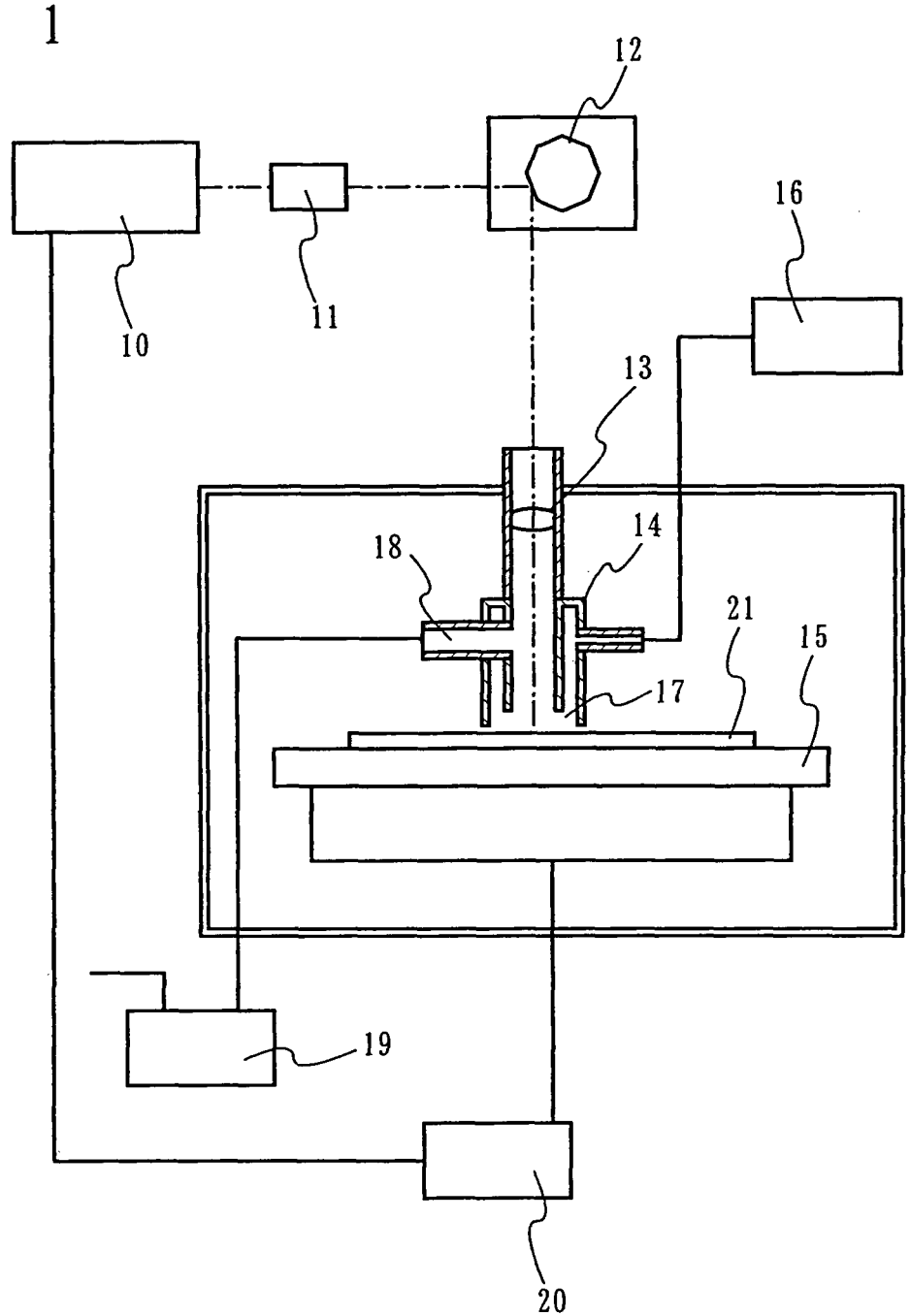
FIG. 1 is a diagram showing the structure of the laser marking apparatus according to Embodiment Mode 1.

A laser processing apparatus in this embodiment mode has a structure in which local shielding unit is provided in order to prevent minute particles, which scatter in processing, from adhering to a substrate surface. The laser processing apparatus shown in FIG. 1 is provided with a laser oscillator 10, a beam shaping optical system 11, a deflection unit 12, a condensing optical system 13, local shielding unit 14, and a mounting base 15. The mounting base 15 is operated in an axial direction or two-axial directions in conjunction with the laser oscillator 10 by means of a control unit 20, and desired processing can be performed at an arbitrary position of a glass substrate 21 on the mounting base 15. As for a deflection unit, any deflector which can change the direction of a laser beam may be used, for example, a mirror which reflects a laser beam. For example, Galvano mirror or polygon mirror may be applied to the deflecting unit of the present invention.

Gas supply unit 16 supplies inert gas such as nitrogen gas or rare gas to the cylindrical local shielding unit 14. The inert gas is jetted from an opening portion 17, which is in a lower part of the local shielding unit 14 and faces the glass substrate 21 and is provided in an outer circumferential portion of the unit, whereby the atmosphere in the periphery of the area irradiated with a laser beam is exchanged to attain shielding against air. An exhaust port 18 which forcibly exhausts the inert gas is provided inside the local shielding unit 14, and the local shielding unit 14 is filled with the inert gas that is jetted from the opening portion 17 and is forcibly exhausted by means of exhaust unit 19.

Figure 2:
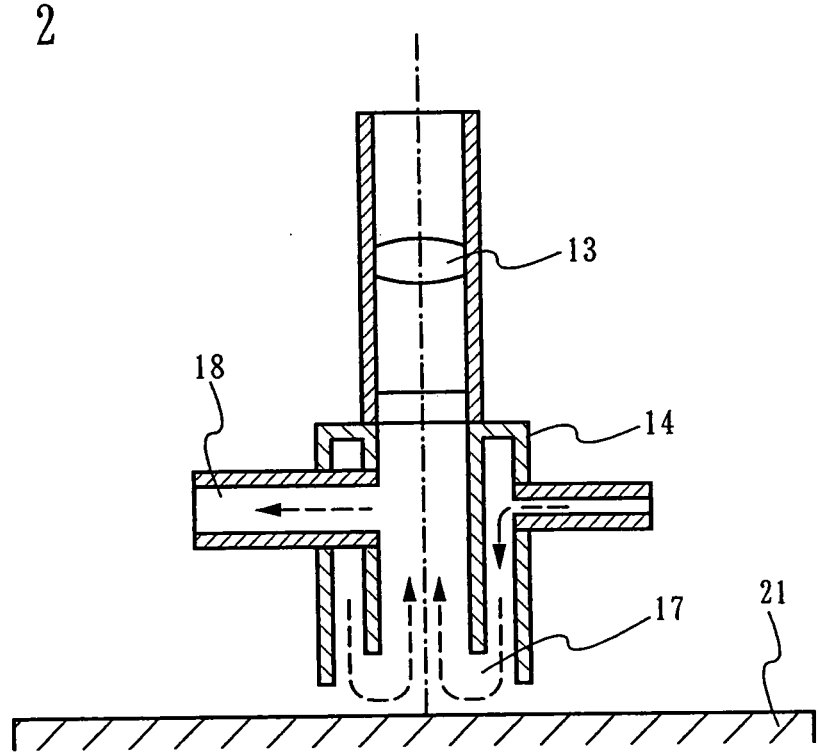
FIG. 2 is a diagram showing the local shielding unit of the laser marking apparatus according to the present invention.

FIG. 2 is a diagram showing details of the local shielding unit 14. The laser beam is irradiated to the glass substrate through a condensing lens, for example, a convex lens as a condensing optical system 13 (hereinafter written as the condensing optical system 13), and the local shielding unit 14 is substantially located coaxially with an irradiation position being the center. The local shielding unit 14 may be adhered to the glass substrate 21, however, the local shielding unit 14 is preferably arranged so as to have a void with a length of approximately from 1 mm to 10 mm with respect to the glass substrate 21. It is preferable that the opening portion 17 for jetting the inert gas have its inward opening surface such that a flow current is generated in an inner cylinder of the local shielding unit 14. The local shielding unit 14 is filled with the inert gas which is jetted from the opening portion 17, and the inert gas is exhausted forcibly. In this case, the flow current is generated from the outer circumferential portion to the inner side surface of the upper portion where the exhaust port is provided; and the flow current exhausts minute particles, each of which is generated through laser processing and has a diameter of approximately from 0.1 μm to 1 μm. Thus, the particles are prevented from scattering to the peripheral portion of the local shielding unit 14 and contaminating the glass substrate 21. Further, the inert gas has a function of cooling the glass substrate, and also has an effect of avoiding cracks and the like during marking processing.

In laser marking processing, characters, numeric characters, symbols, and the like are marked through dot drawing by using a pulsed laser beam. In this case, a $CO_2$ laser (at a wavelength of 10.6 μm), a CO laser (at a wavelength of 5.5 μm), or the like is used as the laser oscillator, and a polygon mirror may be incorporated in the deflection unit 12 and combined with the laser oscillator.

A glass substrate to which laser processing is performed comprises commercial no alkali glass such as aluminosilicate glass or barium borosilicate glass, as typified by a substrate used for a liquid crystal panel. The glass substrate is in the state of bare glass before film formation. Even in case of using the glass substrate over which a thin film with a thickness of several hundred nm such as a silicon oxide film or an amorphous silicon film is formed, application of the laser processing apparatus in this embodiment mode enables laser processing with a clean state kept because scattering materials are not diffused to the surrounding area of the substrate.

Embodiment Mode 2

As to a convenient local shielding unit for preventing minute particles that scatter in processing from adhering to a substrate surface, a cover may be formed of a transparent material with respect to a wavelength of the pulsed laser beam to cover a processed region.

Figure 3:
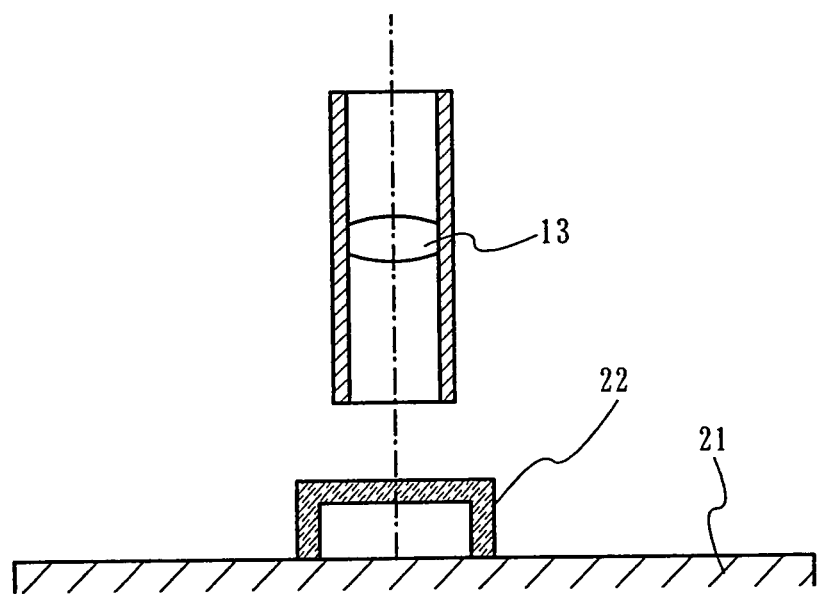
FIG. 3 is a diagram showing the structure of the laser marking apparatus according to Embodiment Mode 2.

FIG. 3 is a diagram for explaining the mode, and a local shielding unit 22 is provided between the condensing optical system 13 and the glass substrate 21 so as to cover a processed portion of the glass substrate 21. In FIG. 3, like components are denoted by like numerals as of FIG. 1 and FIG. 2. The local shielding unit 22 may be formed of a transparent material with respect to a wavelength of a laser beam used for processing, and synthetic quartz or glass such as barium borosilicate glass or aluminosilicate glass is adopted. ZnSe may be used in case that the wavelength of the laser beam is from 1 µm to 10 µm.

Embodiment Mode 3

Figure 4:
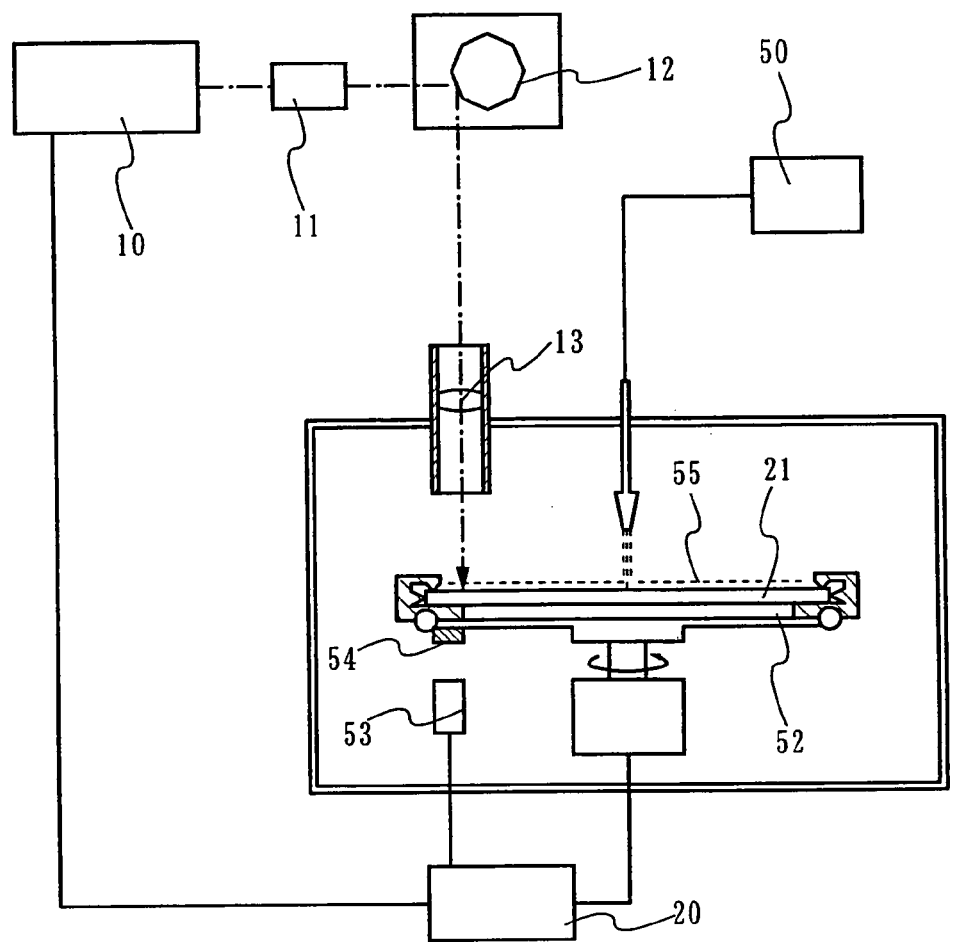
FIG. 4 is a diagram showing the structure of the laser marking apparatus according to Embodiment Mode 3.

A laser processing apparatus in this embodiment mode is provided with an application unit that forms a protective film over a substrate surface in order to prevent minute particles that scatter in processing from adhering to the substrate surface. In FIG. 4, like components are denoted by like numerals as of FIG. 1. The laser processing apparatus shown in FIG. 4 is provided with the laser oscillator 10, the beam shaping optical system 11, deflecting unit 12, the condensing optical system 13, an application unit 50, a mounting base 52 that chucks the glass substrate 21 and rotates simultaneously, and a rotational speed sensor 53. The mounting base 52 is operated in conjunction with the laser oscillator 10 by means of the control unit 20, and processing can be performed at an arbitrary position of the glass substrate 21 fixed onto the mounting base 52.

The application unit 50 that forms a protective film rotates the glass substrate 21, and supplies liquid such as water (pure water) or alcohol to the surface simultaneously. Then, a liquid film 55 is formed on the surface of the glass substrate 21, and processing is performed in this state. Since the liquid film 55 is formed on the entire surface of the glass substrate, even if minute particles, each of which has a diameter of approximately from 0.1 µm to 1 µm, scatter, the minute particles can be prevented from adhering to the main surface of the substrate. The liquid film 55 is not required after processing; accordingly, spin drying is performed while the mounting base 52 is being rotated. Therefore, the liquid supplied from the application unit 50 is preferably a material such as alcohol that has relatively high volatility. The minute particles generated in processing are contained in a solution, and are released outside of the glass substrate together with the solution due to a centrifugal force. Thus, the particles do not adhere to the surface of the glass substrate again. Even if the minute particles each of which has a diameter of approximately from 0.1 µm to 1 µm scatter into a gas phase, the particles can be prevented from adhering to the main surface of the substrate.

Since processing is performed while the glass substrate 21 is being rotated, the rotational speed sensor 53 optically detects the rotational speed of the substrate and the position of a marker 54 attached onto the mounting base 52, and oscillates a laser pulse at predetermined timing in conjunction with the laser oscillator 10 by means of the control unit 20. Further, the mounting base 52 shall be movable in an axial direction or two-axial directions perpendicular to each other, and is operated in conjunction with the rotation of the glass substrate.

In laser marking processing, characters, numeric characters, symbols, and the like are marked through dot drawing with the use of a pulsed laser beam. In this case, a $CO_2$ laser (at a wavelength of 10.6 µm), a CO laser (at a wavelength of 5.5 µm), or the like is used as the laser oscillator, and a polygon mirror may be incorporated in the deflecting unit 12 and combined with the laser oscillator.

A glass substrate to which laser processing is performed is made of commercial no alkali glass such as aluminosilicate glass or barium borosilicate glass, as typified by a substrate used for a liquid crystal panel. The glass substrate is in the state of bare glass before film formation. Application of the laser processing apparatus in this embodiment mode enables laser processing with a clean state kept because scattering materials are not diffused to the surrounding area of the substrate. Further, when a system being capable of supplying plural chemical solutions to the application unit 50 is provided, a function of performing spin cleaning can be additionally provided.

Embodiment Mode 4

Figure 5:
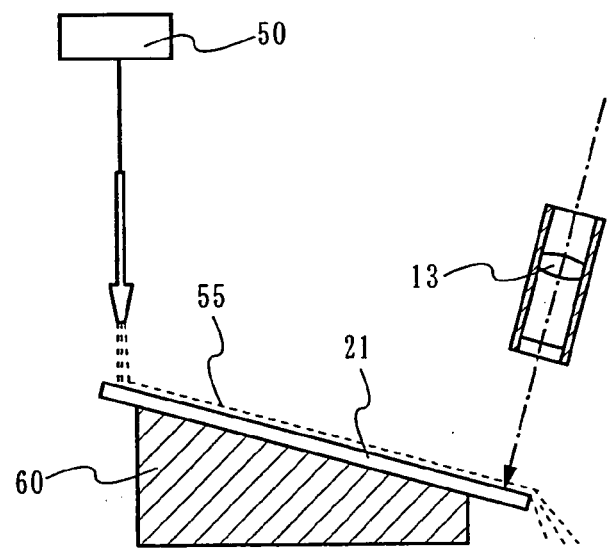
FIG. 5 is a diagram showing the structure of the laser marking apparatus according to Embodiment Mode 4.

A mounting base 60, which holds the substrate 21 sloped, may be provided as shown in FIG. 5 instead of the mounting base that chucks the glass substrate and rotates in Embodiment Mode 3.

In FIG. 5, like components are denoted by like numerals as of FIG. 1 and FIG. 4. Liquid such as water (pure water) or alcohol is supplied to the surface of the glass substrate 21 from an upper portion of the sloped glass substrate 21 by means of the application unit 50. The liquid may be supplied in the form of mist. Consequently, the liquid flows from an upper end portion to a lower portion of the substrate held sloped, whereby a liquid film 55 is formed. The condensing optical system 13 is arranged in the normal direction of the glass substrate 21, and performs irradiation with a laser beam. In laser marking processing, characters, numeric characters, symbols, and the like are marked through dot drawing by using a pulsed laser beam. In this case, a $CO_2$ laser (at a wavelength of 10.6 µm), a CO laser (at a wavelength of 5.5 µm), or the like is used as the laser oscillator, and a polygon mirror may be incorporated in the beam shaping optical system 11 and combined with the laser oscillator.

The above-described embodiment mode can attain the same effect as that in Embodiment 3. In this embodiment mode, a rotational mechanism is not required, and the structure of the laser processing apparatus can be simplified accordingly.

What is claimed is:

1. A laser processing method comprising:
providing a local shielding unit so as to cover a processing region of an object, the local shielding unit having a gas inlet, an exhaust port and a hollow elongated tube;
irradiating the processing region with a laser beam through the hollow elongated tube;
blowing a gas to a surface of the object through the gas inlet; and
exhausting the gas out the exhaust port,
wherein a condensing optical system is provided within a portion of the exhaust port so as to be coaxially aligned with an entrance to the exhaust port.

2. A laser processing method comprising:
providing a local shielding unit so as to cover a processing region of an object, the local shielding unit having a gas inlet, an exhaust port and a hollow elongated tube;
irradiating the processing region with a laser beam through a condensing optical system and through the hollow elongated tube;

blowing a gas to a surface of the object through the gas inlet; and exhausting the gas out the exhaust port, wherein the exhaust port is provided radially inward from the gas inlet, and wherein the condensing optical system is provided within a portion of the exhaust port so as to be coaxially aligned with an entrance to the exhaust port.

3. A laser processing method comprising:

providing a local shielding unit so as to cover a processing region of an object, the local shielding unit having a gas inlet and an exhaust port;

irradiating the processing region with a laser beam;

blowing a gas to a surface of the object through the gas inlet; and exhausting the gas out the exhaust port, wherein the gas inlet extends around an inner periphery of the local shielding unit, wherein the exhaust port is provided radially inward from the gas inlet, and wherein a condensing optical system is provided within a portion of the exhaust port so as to be coaxially aligned with an entrance to the exhaust port.

4. A laser processing method according to claim 1, wherein the irradiation of the laser beam is performed for marking on the object.

5. A laser processing method according to claim 2, wherein the irradiation of the laser beam is performed for marking on the object.

6. A laser processing method according to claim 3, wherein the irradiation of the laser beam is performed for marking on the object.

7. A laser processing method according to claim 1, wherein the object is one selected from the group consisting of a glass substrate, a quartz substrate, a semiconductor substrate, and a plastic substrate.

8. A laser processing method according to claim 2, wherein the object is one selected from the group consisting of a glass substrate, a quartz substrate, a semiconductor substrate, and a plastic substrate.

9. A laser processing method according to claim 3, wherein the object is one selected from the group consisting of a glass substrate, a quartz substrate, a semiconductor substrate, and a plastic substrate.

10. A laser processing method according to claim 1, wherein the exhaust port is provided radially inward from the gas inlet.

11. A laser processing method according to claim 2, wherein the gas inlet extends around an inner periphery of the local shielding unit.

12. A laser processing method according to claim 1, wherein the gas is nitrogen gas or inert gas.

13. A laser processing method according to claim 2, wherein the gas is nitrogen gas or inert gas.

14. A laser processing method according to claim 3, wherein the condensing optical system is contained within a hollow elongated tube extending above the object, and wherein the laser beam is irradiated through the hollow elongated tube.

15. A laser processing method comprising:

providing a local shielding unit so as to cover a processing region of an object, the local shielding unit having a gas inlet and an exhaust port;

irradiating the processing region with a laser beam through a portion of the exhaust port;

blowing a gas to a surface of the object through the gas inlet; and exhausting the gas out the exhaust port, wherein minute particles generated by the irradiation of the laser beam are prevented from scattering to a periphery of the processing region by being contained within the local shielding unit and exhausted out the exhaust port with the gas, wherein the gas inlet extends around an inner periphery of the local shielding unit, wherein the exhaust port is provided radially inward from the gas inlet, and wherein a condensing optical system is provided within a portion of the exhaust port so as to be coaxially aligned with an entrance to the exhaust port.

16. A laser processing method according to claim 15, wherein the laser beam is irradiated through the condensing optical system.

* * * * *

UNITED STATES PATENT AND TRADEMARK OFFICE
CERTIFICATE OF CORRECTION

Page 1 of 1

PATENT NO. : 8,449,806 B2
APPLICATION NO. : 11/984905
DATED : May 28, 2013
INVENTOR(S) : Hidekazu Miyairi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this
Seventeenth Day of November, 2015

Michelle K. Lee
*Director of the United States Patent and Trademark Office*